(12) United States Patent
Demchenko

(10) Patent No.: US 10,268,506 B2
(45) Date of Patent: Apr. 23, 2019

(54) METHOD AND SYSTEM FOR MASTER LESS NODE COMMUNICATION

(71) Applicant: YANDEX EUROPE AG, Lucerne (CH)

(72) Inventor: Grigory Victorovich Demchenko, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 161 days.

(21) Appl. No.: 15/457,349

(22) Filed: Mar. 13, 2017

(65) Prior Publication Data

US 2018/0088983 A1    Mar. 29, 2018

(30) Foreign Application Priority Data

Apr. 4, 2016 (RU) ................. 2016112614

(51) Int. Cl.
*H04L 12/24* (2006.01)
*G06F 9/48* (2006.01)
*H04L 29/08* (2006.01)

(52) U.S. Cl.
CPC ........ *G06F 9/4843* (2013.01); *H04L 41/0654* (2013.01); *H04L 41/0803* (2013.01); *H04L 67/10* (2013.01)

(58) Field of Classification Search
CPC ................. G06F 9/4843; H04L 67/10
See application file for complete search history.

(56) References Cited

U.S. PATENT DOCUMENTS

| | | | |
|---|---|---|---|
| 4,387,425 A | 6/1983 | El-Gohary | |
| 6,463,532 B1 | 10/2002 | Reuter et al. | |
| 7,051,180 B2 | 5/2006 | Downer et al. | |
| 7,487,160 B2* | 2/2009 | Whyte | G06F 9/466 |
| 7,555,516 B2 | 6/2009 | Lamport | |
| 7,797,457 B2 | 9/2010 | Lamport | |
| 8,332,443 B2 | 12/2012 | Plancarte et al. | |
| 8,972,577 B2 | 3/2015 | Bauchot et al. | |
| 9,172,670 B1 | 10/2015 | Gupta et al. | |
| 2007/0214355 A1 | 9/2007 | Lamport | |
| 2008/0134219 A1* | 6/2008 | Dorrance | G06F 17/30371 |
| | | | 719/328 |
| 2013/0110781 A1 | 5/2013 | Golab et al. | |
| 2014/0289197 A1 | 9/2014 | Webber et al. | |

OTHER PUBLICATIONS

Guerraoui et al., "Consensus Service: a modular approach for building agreement protocols in distributed systems", Ecole Polytechnique Federale De Lausanne, Switzerland, pp. 1-10.

* cited by examiner

*Primary Examiner* — Esther B. Henderson
(74) *Attorney, Agent, or Firm* — BCF LLP

(57) ABSTRACT

A distributed computing system comprising a plurality of nodes may be configured to receive a client request from at least one client device connected to the distributed computing system over a communication network. Each node of the plurality of nodes may be interlinked and configured to execute an action commit routine independently by broadcasting messages to each other and without electing a leader node. A node from the plurality of nodes may receive the client request and broadcast it to the other nodes. A subset of the plurality of nodes of the distributed computing system may execute the action responsive to having at least a number of nodes equal to a predetermined number of nodes going through the three portions of the action commit routine without a failure.

14 Claims, 4 Drawing Sheets

METHOD AND SYSTEM FOR MASTER LESS NODE COMMUNICATION

CROSS-REFERENCE

The present application claims priority to Russian Patent Application No. 2016112614, filed Apr. 4, 2016, entitled "METHOD AND SYSTEM FOR MASTER LESS NODE COMMUNICATION", the entirety of which is incorporated herein by reference.

FIELD

The present technology relates to systems and methods for communication in distributed systems. In particular, the systems and methods aim at solving problems of tasks execution in distributed systems without electing a leader.

BACKGROUND

Distributed systems, also known as distributed computing, relate to a collection of autonomous computational entities or nodes in a network comprising software to produce an integrated computing facility by communicating and coordinating actions by exchanging messages. Distributed systems allow for more efficient task execution due to their size and power, which is superior to a combination of stand-alone systems. Distributed systems have a variety of application fields such as telecommunication networks, real-time process control and parallel computation, among others. Distributed systems may have different architectures such as client-server, three-tier, n-tier, or peer-to-peer, loose coupling or tight coupling.

Consensus in the context of distributed systems is the task of getting all processes in a network to agree on some specific value by voting. A value is usually proposed by at least one of the nodes of the network, and the rest of the nodes must vote to agree on whether to do something or not. Consensus is useful for coordinator election, also known as a leader election. A leader in the context of a distributed system is a single process or node usually designated as the organizer among the nodes of the distributed system. A leader node may for example handle client requests and solve conflicts among the nodes in the distributed system.

One of the challenges of distributed systems is the handling of failures, because of the complexity and possibly large number of components in interaction. As a result, reliability is one of the most sought characteristics of distributed systems. Failures in distributed systems fall in hardware and software categories. Several types of failures exist: halting failures, fail-stop, omission failures, network failures, network partition failure, timing failures and byzantine failures. Other desired features of distributed systems include resource sharing, openness, concurrency, scalability, fault tolerance and transparency.

Different methods and algorithms have been devised for dealing with such failures. Known algorithms, such as Paxos and Raft, are used for solving consensus problems in a network of unreliable processors. Such methods teach ways to elect a leader from a plurality of nodes. The leader node is then responsible for handling client requests and solving conflicts between nodes. Such systems usually operate synchronously and require a leader or virtual leader.

SUMMARY

The present technology may ameliorate at least some deficiencies of the prior art with respect to executing an action commit routine in a distributed system without electing a leader.

In one aspect, implementations of the present technology provide a method for executing an action commit routine in a distributed computing system, the distributed computing system having a plurality of nodes; the action commit routine being independently executable at each node of the plurality of nodes; each node of the plurality of nodes being aware of each other's presence within the distributed computing system, each node of the plurality of nodes being configured for receiving a client message from a client device that is communicatively coupled to the distributed computing system via a communication network; a particular node of the plurality of nodes having received a first client message from the client device, the first client message including a request for the distributed computing system to execute a first action, the particular node of the plurality of nodes having broadcasted a first status message including an indication of the first action to a remainder of the plurality of nodes, broadcasting of the first status message being a first portion of the action commit routine; the method comprising: receiving, by a given node of the plurality of nodes from a first subset of the plurality of nodes, a first plurality of response messages comprising a respective response to the first status message from each one of the first subset of the plurality of nodes; in response to a number of nodes within the first subset of the plurality of nodes being at least equal to a pre-determined threshold, executing by the given node a second portion of the action commit routine, the second portion of the action commit routine sequentially following the first portion, the executing comprising broadcasting, by the given node to at least the first subset of the plurality of nodes, a second status message, the broadcasting of the second status message being part of the second portion of the action commit routine.

In some implementations the first portion of the action commit routine further comprises: receiving, by the given node of the plurality of nodes from the particular node, the first status message including the indication of the first action; and broadcasting, by the given node to another subset of the plurality of nodes, a response to the first status message.

In some implementations, the action commit routine further comprises a third portion of the action commit routine, the third portion of the action commit routine sequentially following the second portion, the method further comprising: receiving, by the given node of the plurality of nodes from a second subset of the plurality of nodes, a second plurality of messages comprising a respective second status message from each one of the second subset of the plurality of nodes; in response to a number of nodes within the second subset of the plurality of nodes being at least equal to the pre-determined threshold, executing by the given node the third portion of the action commit routine, the executing comprising broadcasting, by the given node to at least the second subset of the plurality of nodes, a third status message, the broadcasting of the third status message being part of the third portion of the action commit routine.

In some implementations, the method further comprises: receiving, by the given node of the plurality of nodes from a third subset of the plurality of nodes, a third plurality of messages comprising a respective third status message from each one of the third subset of the plurality of nodes; and in response to a number of nodes within the third subset of the plurality of nodes being at least equal to the pre-determined threshold, executing, by the given node, at least a portion of the first action according to a pre-determined routine.

In some implementations, the method further comprises returning, by the given node, a result of the first action to the particular node, the result of the first action to be aggregated with respective results of the first action of the third subset of the plurality of nodes by the particular node and transmitted back to the client device.

In some implementations the another subset, the first subset, the second subset and the third subset each comprise the same nodes of the plurality of nodes.

In some implementations, the method further comprises monitoring by the given node a timeout parameter associated with the first portion of the action commit routine and in response to the timeout parameter exceeding a first pre-defined timeout threshold, and wherein said executing by the given node the second portion of the action commit routine is executed without waiting for additional response messages.

In some implementations, the method further comprises monitoring by the given node the timeout parameter, the timeout parameter being further associated with the second portion of the action commit routine and in response to the timeout parameter exceeding a second pre-defined timeout threshold, and wherein said executing by the given node the third portion of the action commit routine is executed without waiting for additional response messages.

In some implementations, the method further comprises monitoring by the given node the timeout parameter, the timeout parameter being further associated with the third portion of the action commit routine and in response to the timeout parameter exceeding a third pre-defined timeout threshold, and wherein said executing by the given node the first action is executed without waiting for additional response messages.

In some implementations, the pre-determined threshold is at least floor (n/2) nodes, where n is the number of nodes within the plurality of nodes.

In some implementations each node of the plurality of nodes is associated with a respective unique ID and wherein each node of the plurality of nodes stores an indication of the respective unique ID of each other node of the plurality of nodes, thereby allowing each node of the plurality of nodes be aware of each other's presence within the distributed computing system.

In some implementations the given node of the plurality of nodes comprises a memory, and wherein the method further comprises, executing by the given node of the plurality of nodes, prior to respectively executing each one of the first portion of the action commit routine, second portion of the action commit routine and the third portion of the action commit routine: storing the first status of message in the memory; storing the first plurality of messages in the memory; storing the second plurality of messages in the memory; and storing the third plurality of messages in the memory.

In some implementations, the method further comprises for another node of the plurality of nodes: receiving, by the another node of the plurality of nodes from the particular node, the first status message including the indication of the first action; broadcasting, by the another node to a fourth subset of the plurality of nodes, a response to the first status message, the response to the first status message being part of a first portion of the action commit routine; receiving, by the another node of the plurality of nodes from the fourth subset of the plurality of nodes, a fourth plurality of messages comprising a respective response to the first status message from each one of the third subset of the plurality of nodes; in response to a number of nodes within the fourth subset of the plurality of nodes being at equal to a pre-determined threshold, executing by the another node a second portion of the action commit routine, the second portion of the action commit routine sequentially following the first portion, the executing comprising broadcasting, by the another node to at least the fourth subset of the plurality of nodes, the second status message, the broadcasting of the second status message being part of the second portion of the action commit routine; receiving, by the another node of the plurality of nodes from a fourth subset of the plurality of nodes, a fifth plurality of messages comprising a respective second status message from each one of the fifth subset of the plurality of nodes; in response to a number of nodes within the fifth subset of the plurality of nodes being at least equal to the pre-determined threshold, executing by the another node the third portion of the action commit routine, the executing comprising broadcasting, by the another node to at least the fifth subset of the plurality of nodes, the third status message, the broadcasting of the third status message being part of the third portion of the action commit routine; receiving, by the another node of the plurality of nodes from a sixth subset of the plurality of nodes, a sixth plurality of messages comprising a respective third status message from each one of the sixth subset of the plurality of nodes; and executing, by the another node, at least a portion of the first action according to a pre-determined routine.

In some implementations of the present technology, there is provided a distributed computing system for providing an action commit routine to at least a client device communicatively coupled to the distributed computing system, the distributed computing system comprising: a plurality of nodes, each node of the plurality of nodes comprising: a network interface, the network interface interlinking each node of the plurality of nodes to each other node of the plurality of nodes over the communication network; an information storage medium, and a processor coupled to the information storage medium, the processor being configured to have access to computer readable commands which commands, when executed, cause the processor to perform, after a particular node of the plurality of nodes received a first client message including an indication of an action from the client device and broadcasted a first status message including an indication of the first action to a remainder of the plurality of nodes, the broadcasting of the first status message being a first portion of the action commit routine: receive, by a given node of the plurality of nodes from a first subset of the plurality of nodes via the communication network, a first plurality of response messages comprising a respective response to the first status message from each one of the first subset of the plurality of nodes; in response to a number of nodes within the first subset of the plurality of nodes being at least equal to a pre-determined threshold, execute by the given node a second portion of the action commit routine, the second portion of the action commit routine sequentially following the first portion, the executing comprising broadcasting, by the given node to at least the first subset of the plurality of nodes via the communication network, a second status message, the broadcasting of the second status message being part of the second portion of the action commit routine.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first node" and "third node" is not intended to imply any particular order, type, chronology, hierarchy or ranking (for example) of/between the node, nor is their use (by itself) intended imply that any "second node" must necessarily exist in any given situation. Further, as is discussed herein in other contexts, reference to a "first" element and a "second" element does not preclude the two elements from being the same actual real-world element. Thus, for example, in some instances, a "first" node and a "second" node may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
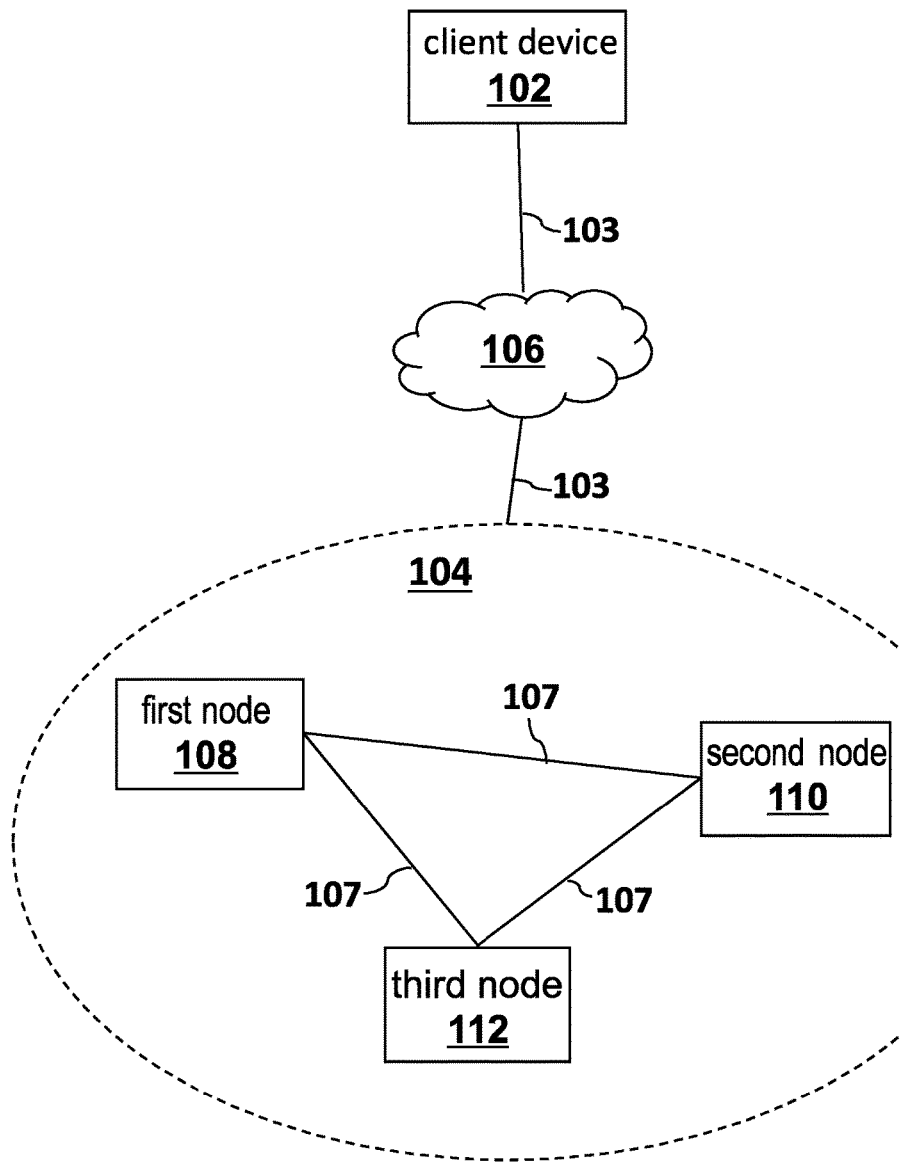
FIG. 1 depicts a diagram of a computer system suitable for implementing the present technology and/or being used in conjunction with implementations of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any block-diagrams, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of block-diagram elements or other elements indicating performance of process steps and/or textual description. Such modules may be executed by hardware that is expressly or implicitly shown.

In accordance with the present technology, a plurality of nodes may refer to at least a minimum of three nodes in a distributed system. A particular node may refer to a node of the distributed system being connected with the client and receiving the client message. A given node may refer to any of the nodes of the plurality of nodes of the distributed system, including the particular node. Another node may refer to every node of the distributed system having not received a client request. Moreover, the plurality of nodes may be divided into (at least) three groups, generally termed "subsets" in the present specification. A first subset of the plurality of nodes, a second subset the plurality of nodes and a third subset of the plurality of nodes may be used to distinguish nodes failing from a step to a subsequent step. The first subset of the plurality of nodes may be a proper or improper subset of the plurality of nodes. The second subset of the plurality of nodes may be a proper or improper subset of the first subset of the plurality of nodes. The third subset of the plurality of nodes may be a proper or improper subset of the second subset of the plurality of nodes. A first plurality of messages may refer to the messages sent by the first subset of the plurality of nodes. A second plurality of messages may refer to the messages sent by the second subset of the plurality of nodes. A third plurality of messages may refer to the messages sent by the third subset of the plurality of nodes. In the scenario wherein the first subset of the plurality of nodes, the second subset of the plurality of nodes and/or the third subset of the plurality of nodes comprise only a single node, the first plurality of messages, the second plurality of messages and/or the third plurality of messages may each be respectively a single message. A pre-determined number of nodes from whom the given node must receive messages to continue the action commit routine may be at least equal to floor(n/2) nodes, where n is the number of the plurality of nodes. In some embodiments, the pre-determined number of nodes may be different.

With these fundamentals in place, we will now consider some non-limiting examples to illustrate various implementations of aspects of the present technology.

With reference to FIG. 1, there is depicted a system 100 suitable for use with some implementations of the present technology. The system 100 may comprise inter alia a client device 102 coupled to a distributed system 104 with communication link 103 over a communication network 106, the distributed system 104 comprising a first node 108, a second node 110 and a third node 112, interlinked by communication links 107.

In the present context, the first node 108, the second node 110 and the third node 112 are examples of a plurality of nodes (not depicted), potentially present in system 100. Each one the first node 108, the second node 110 and the third node 112 is an example of a given node within system 100. The first node 108 is an example of a particular node (not depicted). The second node 110 and the third node 112 are examples of another node (not depicted). The first node 108 and the third node 112 are examples of a first subset of the plurality of nodes (not depicted). The first node 108 and the third node 112 will be used as examples of a second subset of the plurality of nodes. The first node 108 and the third node 108 will be used as examples of a third subset of the plurality of nodes. In the current example, each one the first subset of the plurality of nodes, the second subset of the plurality of nodes, the third subset of the plurality of nodes may have a pre-determined threshold of floor $(3/2) \approx 1$ node.

Each one of the client device 102, the first node 108, the second node 110 and the third node 112 of the system 100 may be situated in a single geographical location, such as in a computer cluster or computer grid, or may be distributed geographically across different devices and linked via a communication network 106 and other communication networks (not depicted), such as the Internet. In some embodiments, the system 100 may be implemented as a cloud server. In other embodiments, the system 100 may be implemented as a peer-to-peer network. In other embodiments of the present technology, the communication network 106 may be implemented differently, such as any wide-area communications network, local-area communications network, a private communications network and the like. Various implementations of the system 100 may be possible, as it would be recognized by the person skilled in the art of the current technology.

The implementation of the client device 102 is not particularly limited, but as an example, the client device 102 may interact with the distributed system 104 by transmitting/receiving data to/from the distributed system 104 over the communication network 106 with communication link 103. The client device 102 may comprise inter alia internal hardware components including one or more single or multi-core processors collectively referred to herein as processor (not depicted), a random access memory (not depicted), and a network interface (not depicted) for communicating with the distributed system 104. In some embodiments, the client device 102 may have been programmed to provide commands and requests to the distributed system 104. In the context of the present specification, "client" or "client device" refers to a unit that consumes a service provided by the distributed system 104, and is any computer hardware that is capable of running software appropriate to the relevant task at hand. Thus, some (non-limiting) examples of client devices 102 include personal computers (desktops, laptops, netbooks, etc.), smartphones, and tablets, as well as network equipment such as routers, switches, and gateways. It should be noted that a device acting as the client device 102 in the present context is not precluded from acting as a node or server to other client devices (not depicted). In some embodiments, the client device 102 may be another distributed system (not depicted). In other embodiments, the client device 102 may run on the same machine as the distributed system 104 or any one of the first node 108, the second node 110, and the third node 112. The client device 102 may not need to know the details of how the service is provided by the distributed system 104 or how the data it is receiving is stored or calculated. The use of the expression "a client device" does not preclude multiple client devices being used in receiving/sending, carrying out or causing to be carried out any task or request, or the consequences of any task or request, or steps of any method described herein.

In the embodiment illustrated herein, the client device 102 is coupled to the distributed system 104 with communication link 103 over a communication network 106. How the communication network 106 is implemented is not particularly limited and will depend on how the client device 102 and/or the distributed system 104 are implemented. In some embodiments, the client device 102 may be directly linked to at least one of the first node 108, the second node 110 and the third node 112. Merely as an example and not as a limitation, in those embodiments of the present technology where the client device 102 is implemented as a desktop or laptop computer, the communication link 103 can be either wireless (such as the Wireless Fidelity, or WiFi®, Bluetooth® and the like) or wired (such as an Ethernet based connection). In other embodiments, where the client device may be implemented as a wireless communication device (such as a smart-phone), the communication link 103 may be implemented as a wireless communication link (such as but not limited to, a 3G communications network link, a 4G communications network link, a Wireless Fidelity, or WiFi®, Bluetooth® and the like).

It should be expressly understood that implementations for the client device 102, the communication link 103, the communication network 106 and the distributed system 104 are provided for illustration purposes only. As such, those skilled in the art will easily appreciate other specific implementational details for the client device 102, the communication link 103, the communication network 106 and the distributed system 104. As such, by no means, examples provided herein above are meant to limit the scope of the present technology.

In the context of the current technology, the terms "distributed network", "distributed system", and "distributed computing" refer to components that communicate and coordinate their actions by passing messages in order to achieve a common goal. The distributed system 104 may be situated in a single geographical location, such as in a computer cluster or computer grid, or may be distributed geographically across different devices and linked with communication links 107 over a communication network (not depicted), such as the internet. In the depicted non-limiting embodiment of present technology, the distributed system 104 includes the first node 108, the second 110 and the third node 112. The distributed system 104 may be configured to execute tasks sequentially, concurrently, in parallel or by any computing paradigm that would enable the distributed system 104 to execute tasks requested by the client device 102, as it would be recognized by a person skilled in the art of the current technology. Generally speaking, each one of the first node 108, the second node 110 and the third node 112 of the distributed system 104 may be aware of each other's presence within the system 100. In some embodiments, each one of the first node 108, the second node 110 and the third node 112 may be associated with a respective unique ID and may store the respective unique ID of each other one of the first node 108, the second node 110 and the third node 112 of the distributed system 104, thereby allowing each one of the first node 108, the second node 110 and the third node 112 to be aware of each other's presence within the distributed system 104. In some embodiments, each one of the first node 108, the second node 110 and the third node 112 may have each other's IP address. In some embodiments, the first node 108, the second 110 and the third node 112 of the distributed system 104 may use a shared memory (not depicted), a shared database (not depicted) or share any other resource (not depicted).

The implementation of the first node 108, the second node 110 and the third node 112 is well known to the person skilled in the art of the present technology. However, briefly speaking, the first node 108, the second node 110 and the third node 112 may each comprise a respective communication interface (not depicted) structured and configured to communicate with each other and various entities (such as the client device 102, for example and other devices potentially coupled to the distributed system 104) via communication links 107. In the context of the present specification, a "node" may be a computer program that is running on appropriate hardware and is capable of receiving and transmitting requests (e.g. from client devices or other nodes) over a communication network 106, and carrying out those requests, or causing those requests to be carried out. The first node 108, the second node 110 and the third node 112 may each have the ability to store data into volatile memory and into stable state, and may execute a timing module or clock to monitor messages. In some embodiments, each one of the first node 108, the second node 110 and the third node 112 may maintain a respective database (not depicted). In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. The hardware may be one physical computer or one physical computer system, but neither is required to be the case with respect to the present technology.

In the present context, the use of the expression a "node" or a "server" is not intended to mean that every task (e.g. received instructions or requests) or any particular task will have been received, carried out, or caused to be carried out, by the same node (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server". The first node 108, the second node 110 and the third node 112 may each be implemented as a conventional computer server. In an example of an embodiment of the present technology, the first node 108, the second node 110 and the third node 112 may each be implemented as a Dell™ PowerEdge™ Server running the Microsoft™ Windows Server™ operating system. Needless to say, the first node 108, the second node 110 and the third node 112 may be implemented in any other suitable hardware and/or software and/or firmware or a combination thereof. The first node 108, the second node 110 and the third node 112 do not necessarily have to be the same hardware. The first node 108, the second node 110 and the third node 112 may not necessarily run on the same operating system (OS) or may not necessarily be programmed in the same programming language. The first node 108, the second node 110 and the third node 112 may be tightly coupled or loosely coupled. In the depicted non-limiting embodiment of present technology, the first node 108, the second node 110 and the third node 112 may each be physically independent servers, such as servers in a server rack. In other embodiments, the first node 108, the second node 110 and the third node 112 may run on the same server. In alternative non-limiting embodiments of the present technology, the functionality of each one of the first node 108, the second node 110 and the third node 112 may be distributed and may be implemented via multiple servers.

The distributed system 104 may be implemented on various communication layers, such as the application layer, the transport layer, the internet layer, the link layer and the physical layer, and according to various communication protocols or rules to encode and decode messages, which may depend on how the first node 108, the second node 110 and the third node 112 of the distributed system 104 are implemented. In some embodiments, the distributed system 104 may use the Internet protocol (IP) suite, also known as Transmission Control Protocol (TCP), commonly abbreviated as TCP/IP. TCP allows clients and nodes to exchange data in packets reliably and in an organized manner. In other embodiments, distributed system 104 may use the User Datagram Protocol (UDP). The first node 108, the second node 110 and the third node 112 may each respectively be interconnected by the communication link 107, the communication link 107 can be either wireless (such as the Wireless Fidelity, or WiFi®, Bluetooth® and the like) or wired (such as an Ethernet based connection), or a combination of wired and wireless.

Embodiments of the distributed system 104 are provided herein only as illustrative purpose and are not indented to limit the scope of the current technology.

The first node 108, the second node 110 and the third node 112 of the distributed system 104 may communicate using message passing. Generally, but non-limitatively, a message may comprise an indication of three parts: a sender, a recipient and a content. The sender is specified so the recipient knows which one of the first node 108, the second node 110 and the third node 112 sent the message, and the recipient is specified to know to which one of the first node 108, the second node 110 and the third node 112 the replies must be send. In some embodiments, a secure channel may be used to transfer messages, wherein messages may be encrypted before being sent and decrypted before being read, based on a shared secret or other known cryptographic methods. In some embodiments, the message passing mechanism may be pure HTTP, remote procedure calls (RPC)-like connectors and message queues. A message may also include a unique message ID to identify the message, the content of previous action by any node of the distributed system 104 (i.e. the first node 108, the second node 110 and the third node 112), a priority number, a timestamp, a list of actions to be executed, instructions to send other messages, executable code, statistics about its sender such as average response time and other relevant information about the distributed system 104. The content of the message may be implemented in various ways, as it would be recognized by a person skilled in the art of the current technology.

In the present context, broadcasting refers to a method of message passing by transferring a message to all other nodes (i.e. each one of the first node 108, the second node 110 and the third node 112) of the distributed system 104. Messages may be sent simultaneously or non-simultaneously. Broadcasting may be performed as "all scatter", wherein each sender node performs its own scatter in which messages may be distinct for each receiver, or "all broadcast", wherein the messages are the same for each receiver. In some embodiments, broadcasting may be replaced by unicasting, multicasting, unicasting or geocasting.

In the context of the present technology, an action commit routine may refer to a sequence of program instructions to prepare to perform a specific task or action. The action commit routine may be executed independently by each one of the first node 108, the second node 110 and the third node 112 of the distributed system 104, meaning that each one of the first node 108, the second node 110 and the third node 112 may be configured, after receiving an initial request, to carry a sequence of steps of the action commit routine, regardless of what other nodes are doing. A first portion of the action commit routine may be referred to as a voting phase. A second portion of the action commit routine may be referred to as an acceptation phase. A third portion of the action commit routine may be referred to as a commit phase. In some embodiments, the first node 108, the second node 110 and the third node 112 of the distributed system 104 may have fallback positions in case of failures, wherein a step may be repeated following the failure of the first node 108, the second node 110 and the third node 112. In some embodiments, the action commit routine may be used in conjunction with other known methods in distributed systems, such as leader election, Paxos, Raft, and many others, as it would be recognized by a person skilled in the art of the current technology.

Generally, a client device 102 may connect itself to the distributed system 104 via communication link 103 over a communication network 106 to request the distributed system 104 to execute a first action. The client device 102 may connect to the first node 108 of the distributed system 104. In some embodiments, the client device 102 may connect directly to the first node 108 because of its proximity to the client device 102. In other embodiments, the client device 102 may connect to the first node 108 because of its availability. In some embodiments, the first node 108 is an example of any node and may have been randomly chosen by the client device 102. The client device 102 may then send a request to the first node 108 to execute an action. In some embodiments, the client device 102 request may be a remote procedure call (RPC), wherein a procedure with arguments is passed to the first node 108 and the client device 102 waits until a reply is received or there is a timeout. In other embodiments, the request may be remote method invocation (RMI). In some embodiments, the request from the client device 102 may contain a single command or a sequence of commands to execute. The first node 108 may receive the request for the distributed system 104 to execute a first action. As it would be recognized by someone skilled in the art, the protocol for the remote procedure call/remote method invocation, the server side program and the client side program would have been previously implemented by a programmer. The first node 108 may temporarily save the first client message to its memory or in a database (not depicted), wherein the saved first client message may be associated with the time at which it was received, its origin (in this case the client device 102), the action to execute, the priority, a unique message ID and other pertinent information. In response to receiving the first client message, the first node 108 may broadcast to the rest of the nodes of the distributed system 104, the second node 110 and the third node 112, a first status message, the first status message including an indication of the first action to execute, the broadcasting of to the first status message being part of the first portion of the first action commit routine for the first node. The first portion of the first action commit routine may be a request to the second node 110 and the third node 112 to vote to commit to the first action. The first node 108, executing a timing module (not depicted), may start monitoring a timeout parameter associated with a predefined timeout threshold.

Figure 2:
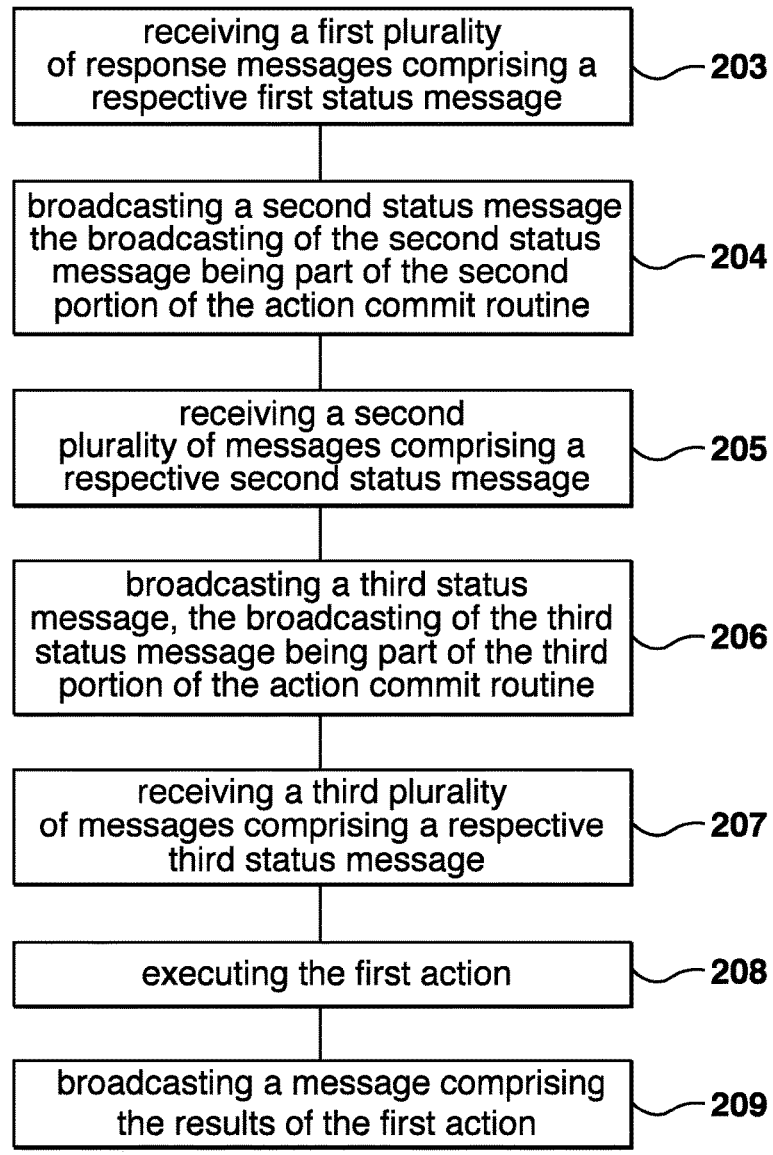
FIG. 2 depicts a block-diagram of a computer-implemented method of a general action commit routine in a distributed system with three nodes as contemplated in some embodiments of the present technology.

FIG. 2 depicts a block-diagram of a non-limiting example of method 200 for executing an action commit routine in a distributed system 104. Generally, the method 200 illustrated herein may be executed independently by each one of the first node 108, the second node 110 and the third node 112 of the distributed system 104, where each one of the first node 108, the second node 110 and the third node 112 may advance at its own pace, and execute specific steps when conditions are satisfied. The method 200 may be executed by the system 100 illustrated in FIG. 1. The method 200 may be the same for every one of the first node 108, the second node 110 and the third node 112. The method 200 depicted herein is executed by the second node 110, but could be executed by any node, such as the first node 108 and the third node 112. The first node 108 may receive the first client message from the client device 102 and broadcast a first status message including an indication of the first action to execute to the second node 110 and the third node 112. Subsequently, the second node 110 and the third node 112 of the distributed system 104 may receive from the first node 108 a respective first status message including an indication of a first action, and may each send a respective response to the first status message, the response to the first status message comprising a positive vote to commit, and being part of the first portion of the action commit routine from the point of view of the second node 110 and the third node 112. The second node 110 and the third node 112 may then start monitoring a respective timeout parameter associated with a first predefined timeout threshold. The method may then start at step 203.

STEP 203: Receiving a First Plurality of Messages Comprising a Respective Response to the First Status Message At a step 203, the second node 110 may receive a first plurality of messages comprising a respective response to the first status message from each one of the first node 108 and the second node 110. Each message of the first plurality of messages may be received at a different time, or some messages may be received at the same time. Each respective response to the first status message in the first plurality of messages from the first node 108 and the third node 112 may comprise a positive vote to commit to the first action. The second node 110 may then save each message of the first plurality of messages as it receives them to its memory or to a database (not depicted). The second node 110, monitoring the timeout parameter, may determine that the timeout parameter has exceeded the first predefined timeout threshold. The second node 110 may then verify that it received the first plurality of messages from a number of nodes at least equal to the pre-determined threshold of one node, and the method 200 may advance to step 204. In other embodiments, where the second node 110 receives a first plurality of response messages from the first node 108 and the third node 112 and before the timeout parameter exceeds the first predefined timeout threshold, the method 200 may advance directly to step 204, the second node 110 having knowledge that all other nodes (the first node 108 and the third node 112) of the distributed system 104 have responded to the first status message. In the embodiments where the number of nodes is below the pre-determined threshold of one node, the second node 110 may broadcast a message to the first node 108 and the third node 112 comprising an indication that the commit action routine is aborted, and the first node 108 having received the first client message may return a message to the client device 102 that the action commit routine was aborted.

STEP 204: Broadcasting a Second Status Message, the Broadcasting of the Second Status Message being Part of the Second Portion of the Action Commit Routine At a step 204, in response to receiving a first plurality of messages from the number of nodes being at least equal to the pre-determined threshold and the timeout parameter exceeding the predefined timeout threshold, the second node 110 may start executing a second portion of the action commit routine. Step 204 may be executed by the second node 110, without regard to what the first node 108 and the third node 112 are doing. The second node 110 may broadcast to the first node 108 and the third node 112, a second status message, the broadcasting of the second status message being part of the second portion of the action commit routine. The second status message may comprise an acceptation to commit to the first action. In some embodiments, the second status message may further comprise information about the second node 110, such as the time it received each message and the content of each message broadcasted by the first node 108 and the third node 112. The second node 110, executing a timing module (not depicted), may then continue to monitor the timeout parameter, the timeout parameter being associated with a second predefined timeout threshold. In some embodiments, the second node 110 may assign a different timeout threshold to each one of the first node 108 and the third node 112 depending on their response time. The method 200 may then advance step 205.

STEP 205: Receiving a Second Plurality of Messages Comprising a Respective Second Status Message At a step 205, after a certain period of time, the second node 110 may receive a second plurality of messages comprising a respective second status message from each one of the first node 108 and the third node 112. Each message of the second plurality of messages may be received at a different time, or some messages may be received at the same time. The second plurality of messages comprising a respective second status message from each one of the first node 108 and the third node 112 may have been sent as a response to receiving a respective first plurality of message. Each respective second status message in the second plurality of messages from the first node 108 and the third node 112 may comprise an indication of an acceptation to commit to the first action. The second node 110 may then save each message of the second plurality of messages as it receives them to its memory or to a database (not depicted). The second node 110, monitoring the timeout parameter, may determine that the timeout parameter has exceeded the second predefined timeout threshold. The second node 110 may then verify that a number of nodes within the second subset of the plurality of nodes is at least equal to the pre-determined threshold of one node and the method 200 may proceed to step 206. In some embodiments, wherein the pre-determined number of nodes is below the pre-determined threshold of one node, the second node 110 may broadcast a message to the first node 108 and the third node 112 that the action commit routine is aborted, and the first node 108 node having received the first client message, may return a message to the client device 102 that the action commit routine is aborted.

STEP 206: Broadcasting a Third Status Message, the Broadcasting of the Third Status Message being Part of the Third Portion of the Action Commit Routine At a step 206, in response to receiving a second plurality of messages from the number of nodes being at least equal to the pre-determined threshold and the timeout parameter exceeding the second predefined timeout threshold, the second node 110 may broadcast to the first node 108 and the third node 112, a third status message, the broadcasting of the third status message being part of the third portion of the action commit routine. The third status message may comprise an indication that the second node 110 is committing to the first action. The third status message may further comprise information about the second node 110, such as the time it received each message from the first node 108 and the third node 112. In some embodiments, the third status message may further comprise an indication of a part of the first action the second node 110 will execute, the part of the first action being chosen according to predetermined criteria such as available processing power, available memory, configuration, etc. The second node 110, executing a timing module (not depicted), may then continue to monitor the timeout parameter, the timeout parameter being associated with a third predefined timeout threshold. The method 200 may then advance to step 207.

STEP 207: Receiving a Third Plurality of Messages Comprising a Respective Third Status Message At a step 207, after a certain period of time, the second node 110 may receive a third plurality of messages comprising a respective third status message from each one of the first node 108 and the third node 112. Each message of the third plurality of messages may be received at a different time, or some messages may be received at the same time. The third plurality of messages comprising a respective third status message from each one of the first node 108 and the third node 112 may have been sent as a response to receiving a respective second plurality of message. Each respective third status message in the third plurality of messages from the first node 108 and the third node 112 may comprise an indication of commitment to the first action. The second node 110 may then save each message of the third plurality of messages as it receives them to its memory or to a database (not depicted). The second node 110, monitoring the timeout parameter, may determine that the timeout parameter has exceeded the third predefined timeout threshold. The second node 110 may then verify that the number of nodes is at least the predetermined threshold of one node, and the method 200 may advance to step 208.

STEP 208: Executing the First Action

At a step 208, in response to receiving a third plurality of messages from the number of nodes being at least equal to the pre-determined threshold and the timeout parameter exceeding the third predefined timeout threshold, the second node 110 may start executing the first action. In some embodiments, a part of the first action may be executed by each one of the first node 108, the second node 110 and the third node 112. In other embodiments, depending on the priority and the number of actions to execute, only two of the first node 108, the second node 110 and the third node 112 may execute the first action. In some embodiments, each one of first node 108, the second node 110 and the third node 112 may execute the first action. After finishing execution of the first action, the method 200 may advance to step 209.

STEP 209: Broadcasting a Message Comprising the Results of the First Action

At a step 209, in response to finishing execution of the first action, the second node 110 may broadcast a message comprising the results of the first action. In some embodiments, the second node 110 may only broadcast a message comprising the results of the first action to the first node 108, the first node 108 being connected to the client device 102. The method 200 ends.

During or after execution of the first action, the first node 108 may receive a fourth plurality of messages, the fourth plurality of messages comprising a respective result of the first action from the second node 110 and the third node 112. In response to receiving a fourth plurality of messages, the fourth plurality of messages comprising a respective result of the first action from the second node 110 and the third node 112, the first node 108 may then aggregate each respective result, and send a message to the client device 102, the message including the results of the first action by each one of the first node 108, the second node 110 and the third node 112.

Figure 3:
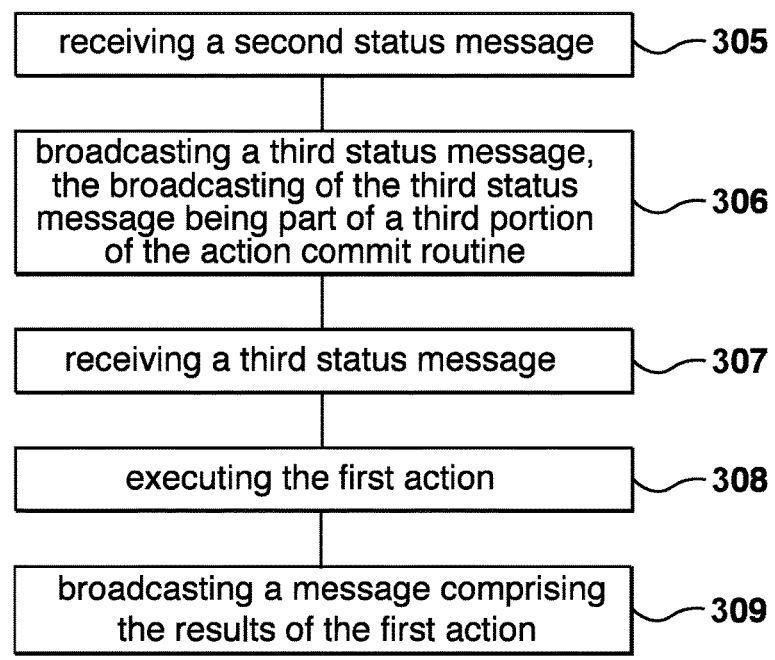
FIG. 3 depicts a block-diagram of a computer-implemented method of an action commit routine in a distributed system with three nodes and a node failure condition as contemplated in some embodiments of the present technology.

Now, referring to FIG. 3, an alternative scenario of the action commit routine of method 200 for the distributed system 103 is illustrated in the form of a block-diagram, wherein a node failure of any one of the first node 108, the second node 110 and the third node 112 may happen at any time of the action commit routine. As someone skilled in the art of the current technology may appreciate, different scenarios of node failure in the distributed system 104 are possible at different steps or portions of the action commit routine, and the method 300 is only provided as an illustrative example. In the non-limiting example depicted herein, the method 300 may be an alternative to steps 205-209 of the method 200, wherein the third node 112 becomes unresponsive between the first and second portions of the action commit routine. The method 300 may start at step 303, which may follow step 203 of the method 200.

STEP 305: Receiving a Second Status Message

At subsequent time or at the same time, at a step 305, the second node 110 may receive a second status message from the first node 108. The second status message may comprise an indication that the first node 108 is accepting to commit to the first action. The second node 110 may then save the second status message from the first node 108 to its memory or to a database (not depicted). After a certain period of time, the second node 110, monitoring the timeout parameter, may determine that the timeout parameter has exceeded the second predefined timeout threshold. The second node 110 may then verify that it received messages from at least a pre-determined threshold of one node, in this case the first node 108. The second node 110, having not received a second status message from the third node 112 or an indication of a second status message from the third node 112 comprised in the second status message of the first node 108, may determine that the third node 112 is unresponsive, and may continue the action commit routine without the third node 112. As it may be understood, the third node 112 may be unresponsive because of a variety reasons, as it may have crashed, stopped functioning because of hardware and/or software errors, or may be disconnected from the communication network 106. In some embodiments, wherein the third node 112 crashed and rebooted before the end of the action commit routine, the third node 112 may continue the action commit routine, after receiving a status message from the first node 108 or the third node 112. The second node 110 may write to its database or memory (not depicted) that the third node 112 is not available, and the method 300 may then advance to step 306.

STEP 306: Broadcasting a Third Status Message, the Broadcasting of the Third Status Message being Part of a Third Portion of the Action Commit Routine.

At a step 306 in response to having received a second status message from the first node 108, the number of nodes being at least equal to the pre-determined threshold and the timeout parameter exceeding the predefined timeout threshold, the second node 110 may broadcast, to the first node 108 and the third node 112, a third status message, the third status message being part of the third portion of the action commit routine. The third status message may comprise a commit message, the commit message indicating that the second node 110 is committing to the execution of the first action. In some embodiments, the third status message from the second node 110 may include an indication that the third node 112 has timed out and is unresponsive, however, since the first node 108 is responding, and the predetermined threshold is of one node, the action commit routine may continue normally. In some embodiments, the third status message may further comprise an indication of a part of the first action the second node 110 will execute, the part of the first action being chosen according to predetermined criteria such as available processing power, available memory, configuration, etc. The second node 110, having previously determined that the third node 112 was unresponsive, may regardlessly send the third status message to the third node 112, in case the third node 112 becomes responsive. In some embodiments, the second node 110, having determined that the third node 112 is unresponsive, may only broadcast the third status message to the first node 108. The second node 110 may continue monitoring the timeout parameter associated with a third predefined timeout threshold. The method 300 may then advance to step 307.

STEP 307: Receiving a Third Status Message from the First Node

At subsequent time, at a step 307, the second node 110 may receive a third status message from the first node 108, the third status message comprising a commit message, the commit message indicating the first node 108 is committing to the first action. The second node 110 may then save the third status message from the first node 108 to its memory or to a database (not depicted). After a certain period of time, the second node 110, monitoring the timeout parameter, may determine that the timeout parameter has exceeded the third predefined timeout threshold. The second node 110 may then verify that it received a third message from at least a pre-determined threshold of one node. In some embodiments, the second node 110 may write to its database or memory that the third node 112 is unresponsive, and continue to step 308. In other embodiments, the second node 110, having knowledge from step 303 that the third node 112 is unresponsive, may advance directly to step 308.

STEP 308: Executing the First Action

At a step 308, in response to receiving a third status message from the first node 108, the number of nodes being at least equal to the pre-determined threshold and the timeout parameter exceeding the third predefined timeout threshold, the second node 110 may start executing the first action. The first action may be executed according to various protocols. In some embodiments, a different part of the first action may be executed by the first node 108 and the second node 110. In other embodiments, depending on priority and the current actions executed by each one of the first node 108 and the second node 110, only one of the nodes 108, 110 may execute the first action. In other embodiments, the first action may be executed in parallel by each one of the first node 108 and the second node 110.

STEP 309: Broadcasting the Results of the First Action

At a step 309, responsive to having finished executing the first action, the second node 110 may broadcast the result of the execution of the first action. In some embodiments the second node 110 may only broadcast the results of the first action to the first node 108. The method 300 may then end.

Figure 4:
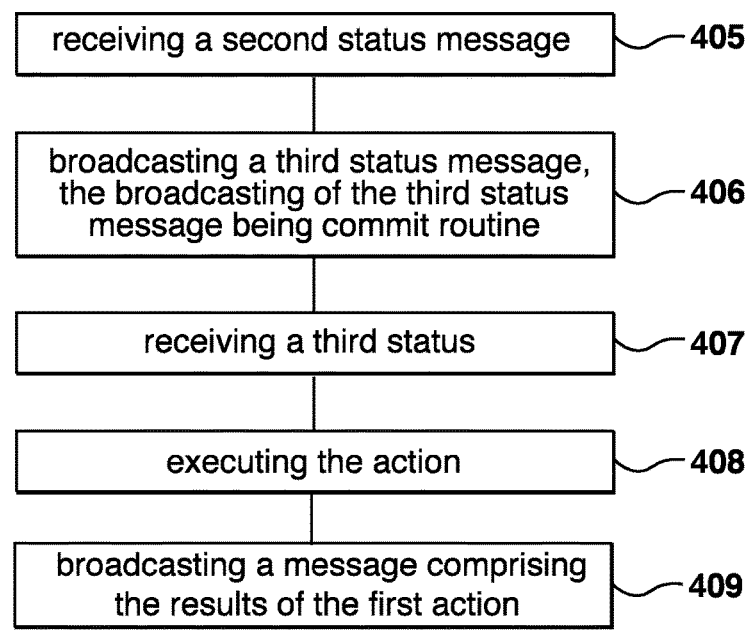
FIG. 4 depicts a block-diagram of a computer-implemented method of an action commit routine in a distributed system with three nodes and a communication link failure condition as contemplated in some embodiments of the present technology.

Now, referring to FIG. 4, another scenario in an action commit routine method 400 is illustrated in the form of a block-diagram. This embodiment illustrates the situation where a communication link (not depicted) between two nodes becomes of the distributed system 104 unreliable, slow or broken. In the example depicted herein, the method 400 may be executed alternatively to steps 205-209 of the method 200, wherein the communication link 107 between the second node 110 and the third node 112 may fail.

STEP 405: Receiving a Second Status Message

At a step 405, the second node 110 may receive a second status message from the first node 108. The second status message may comprise an indication that the first node 108 is accepting to commit to the first action. The second node 110 may then save the second status message from the first node 108 to its memory or to a database (not depicted). After a certain period of time, the second node 110, monitoring the timeout parameter, may determine that the timeout parameter has exceeded the second predefined timeout threshold. The second node 110 may then verify that it received a message from at least a pre-determined threshold of one node, in this case the first node 108. However, the second status message from the first node 108 may comprise an indication that the first node 108 received a status message from the third node 112, and the second node 110 may determine that the third node 112 is available, but a communication problem or failure between the second node 110 and the third node 112 may exist. The second node 110 may then be configured to continue the action commit routine by taking into account the communication failure with the third node 112. The method 400 may then advance to step 406.

STEP 406: Broadcasting a Third Status Message, the Broadcasting of the Third Status Message being Part of a Third Portion of the Action Commit Routine.

At a step 406, in response to receiving a second status message from the number of nodes at least equal to the pre-determined threshold, the timeout parameter exceeding the second predefined timeout threshold and determining that the communication link 107 between the second node 110 and the third node 112 has failed, the second node 110 may broadcast to the first node 108 and the third node 112 a third status message, the third status message being part of the third portion of the action commit routine. The second node 110, having knowledge that the communication link 107 with the third node 112 is unavailable, may regardlessly send a third status message to the third node 112 in case the communication link becomes available. The third status message may comprise a commit message, the commit message indicating that the second node 110 is committing to the execution of the first action. In some embodiments, the second node 110, having knowledge that the communication link 107 with the third node 112 is unavailable, may only broadcast the third status message to the first node 108. In some embodiments, the third status message to the first node 108 may comprise an acknowledgment of the availability of the third node 112 and an indication of a failure of communication between the second node 110 and the third node 112, and a further indication that the second node 110 will extend its timeout threshold, to wait for a response from the third node 112 via the first node 108. The first node 108 may also extend its timeout threshold to wait for a response from the third node 112. The second node 110 may continue monitoring the timeout parameter associated with a third predefined timeout threshold. The method 400 may then advance to step 407.

STEP 407: Receiving a Third Status Message

At subsequent time, at step 407, the second node 110 may receive a third status message from the first node 108, the third status message comprising a commit message, the commit message indicating the first node 108 is committing to the first action and a further indication of the third node 112 committing to the action, the first node 108 having received a third status message from the third node 112. The second node 110 may then save the third status message from the first node 108 to its memory or to a database (not depicted) and advance to step 408. In some embodiments, the second node 110, monitoring the timeout parameter, may determine that the timeout parameter has exceeded the third predefined timeout threshold, verify that it received a third status message with an indication from at least the first node 108, and then advance to step 408. In some embodiments, the second node 110, after verifying it received the message from at least a pre-determined threshold of one node, may advance to step 408 and disregard the third node 112 from the action commit routine.

STEP 408: Executing the Action

At a step 408, in response to receiving a third status message from the first node 108, the first node 108 being at least equal to the pre-determined threshold and the timeout parameter exceeding the third predefined timeout threshold, the second node 110 may start executing the first action. The first action may be executed according to various protocols. In some embodiments, a different part of the first action may be executed by the first node 108, the second node 110 and the third node 112. In other embodiments, depending on priority and the current actions executed by each one of the first node 108, the second node 110 and the third node 112, only two nodes may execute the first action. In some embodiments, each one of the first node 108, the second node 110 and the third node 112 may execute the first action. In other embodiments, the first action may be executed in parallel by the first node 108, the second node 110 and the third node 112.

STEP 409: Broadcasting a Message Comprising the Results of the First Action

At a step 409, in response to finishing execution of the first action, the second node 110 may broadcast a message comprising the results of the first action to the first node 108, the first node 108 being connected to the client device 102. The method 400 for the second node 110 then ends.

As someone skilled in the art of the current technology may appreciate, the distributed system 104 may receive multiple client requests from the client device 102 or other client devices (not depicted). These multiple requests may arrive at any time before, during or after the action commit routine, and the distributed system 104 may proceed with the multiple requests as it proceeded with the first action in methods 200-400. Moreover, when multiple action commit routines are executed at the same time by the first node 108, the second node 110 and the third node 112, a priority number may be assigned to each request by the client device 102 or other client devices (not depicted), and the first node 108, the second node 110 and the third node 112 may decide to execute a request before another request based on its priority number. In some embodiments, depending on the type of requests, the distributed system 104 may be configured to execute multiple requests in parallel. In other embodiments, multiple requests in the distributed system 104 may be treated in a first in first out (FIFO) method. Other methods may be used for executing multiple requests, depending on how the distributed system 104 is implemented.

Some embodiments of the present technology can lead to a technical effect whereby server resources may be optimized and/or saved. Additionally or alternatively, embodiments of the present technology can make the process of client request execution faster compared to prior art approaches.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

While the above-described implementations have been described and shown with reference to particular steps performed in a particular order, it will be understood that these steps may be combined, subdivided, or reordered without departing from the teachings of the present technology. Accordingly, the order and grouping of the steps is not a limitation of the present technology.

One skilled in the art will appreciate when the instant description refers to "receiving data" from a user that the electronic device or another electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology will become apparent to those skilled in the art. The foregoing description is intended to be exemplary rather than limiting. The scope of the present technology is therefore intended to be limited solely by the scope of the appended claims.

Embodiments of the present technology can be summarized as follows, expressed in numbered clauses.

CLAUSE 1. A method (200) for executing an action commit routine in a distributed computing system (104), the distributed computing system (104) having a plurality of nodes (108, 110, 112); the action commit routine being independently executable at each node of the plurality of nodes (108, 110, 112); each node of the plurality of nodes (108, 110, 112) being aware of each other's (108, 110, 112) presence within the distributed computing system (104), each node of the plurality of nodes (108, 110, 112) being configured for receiving a client message from a client device (102) that is communicatively coupled (103) to the distributed computing system (104) via a communication network (106); a particular node (108) of the plurality of nodes having received a first client message from the client device (102), the first client message including a request for the distributed computing system (104) to execute a first action, the particular node (108) of the plurality of nodes (108, 110, 112) having broadcasted a first status message including an indication of the first action to a remainder of the plurality of nodes (110, 112), broadcasting of the first status message being a first portion of the action commit routine; the method (200) comprising:

receiving (203), by a given node (110,) of the plurality of nodes (108, 110, 112) from a first subset of the plurality of nodes (108, 112), a first plurality of response messages comprising a respective response to the first status message from each one of the first subset of the plurality of nodes (108, 112);

in response to a number of nodes within the first subset of the plurality of nodes (108, 112) being at least equal to a pre-determined threshold, executing (204) by the given node (110) a second portion of the action commit routine, the second portion of the action commit routine sequentially following the first portion, the executing comprising broadcasting, by the given node to at least the first subset of the plurality of nodes (108, 112), a second status message, the broadcasting of the second status message being part of the second portion of the action commit routine.

CLAUSE 2. The method (200) of CLAUSE 1, wherein the first portion of the action commit routine further comprises:

receiving, by the given node (108) of the plurality of nodes from the particular node (110), the first status message including the indication of the first action; and broadcasting, by the given node (110) to another subset of the plurality of nodes (108, 112), a response to the first status message.

CLAUSE 3. The method (200) of clause 2, the action commit routine further comprising a third portion of the action commit routine, the third portion of the action commit routine sequentially following the second portion, the method further comprising:

receiving (205), by the given node (110) of the plurality of nodes (108, 110, 112) from a second subset of the plurality of nodes (108, 112), a second plurality of messages comprising a respective second status message from each one of the second subset of the plurality of nodes (108, 112);

in response to a number of nodes within the second subset of the plurality of nodes (108, 112) being at least equal to the pre-determined threshold, executing by the given node the third portion of the action commit routine, the executing comprising broadcasting (206), by the given node (110) to at least the second subset of the plurality of nodes (108, 112), a third status message, the broadcasting of the third status message being part of the third portion of the action commit routine.

CLAUSE 4. The method (200) of clause 3, further comprising:

Receiving (207), by the given node (110) of the plurality of nodes (108, 110, 112), from a third subset of the plurality of nodes (108, 112), a third plurality of messages comprising a respective third status message from each one of the third subset of the plurality of nodes; and executing (208), by the given node (110), at least a portion of the first action according to a pre-determined routine.

CLAUSE 5. The method (200) of clause 4, further comprising returning, by the given node (110), a result of the first action to the particular node (108), the result of the first action to be aggregated with respective results of the first action of the second subset of the plurality of nodes (108, 112) by the particular node (108) and transmitted back to the client device (102).

CLAUSE 6. The method (200) of clause 5, wherein the another subset (108, 112), the first subset (108, 112), the second subset (108, 112), the third subset (108, 112) each comprise the same nodes of the plurality of nodes.

CLAUSE 7. The method (200) of clause 6, the method (200) further comprising:

Monitoring (203) by the given node (110) a timeout parameter associated with the first portion of the action commit routine and in response to the timeout parameter exceeding a first pre-defined timeout threshold, and wherein said executing (204) by the given node the second portion of the action commit routine is executed without waiting for additional response messages.

CLAUSE 8. The method (200) of clause 7, the method (200) further comprising:

monitoring by the given node (110) the timeout parameter, the timeout parameter being further associated with the second portion of the action commit routine and in response to the timeout parameter exceeding a second pre-defined timeout threshold, and wherein said executing (206) by the given node the third portion of the action commit routine is executed without waiting for additional response messages.

CLAUSE 9. The method (200) of claim 8, the method (200) further comprising:

monitoring by the given node (110) the timeout parameter, the timeout parameter being further associated with the third portion of the action commit routine and in response to the timeout parameter exceeding a third pre-defined timeout threshold, and wherein said executing by the given node the first action is executed without waiting for additional response messages.

CLAUSE 10. The method (200) of clause 1, wherein the pre-determined threshold is at least floor(n/2) nodes, where n is the number of nodes within the plurality of nodes (108, 110, 112).

CLAUSE 11. The method (200) of clause 1, wherein each node of the plurality of nodes (108, 110, 112) is associated with a respective unique ID and wherein each node of the plurality of nodes (108, 110, 112) stores an indication of the respective unique ID of each other node of the plurality of nodes (108, 110, 112), thereby allowing each node of the plurality of nodes (108, 110, 112) be aware of each other's presence within the distributed computing system (104).

CLAUSE 12. The method (200) of clause 2, wherein the given node (110) of the plurality of nodes (108, 110, 112) comprises a memory, and wherein the method further comprises, executing by the given node (110) of the plurality of nodes (108, 110, 112), prior to respectively executing each one of the first portion of the action commit routine, second portion of the action commit routine and the third portion of the action commit routine:

storing (200) the first status of message in the memory;
storing (203) the first plurality of messages in the memory;
storing (205) the second plurality of messages in the memory; and
storing (207) the third plurality of messages in the memory.

CLAUSE 13. The method (200) of clause 1, the method (200) further comprising, for another node (112) of the plurality of nodes:

receiving, by the another node (112) of the plurality of nodes (108, 110, 112) from the particular node (108), the first status message including the indication of the first action;

broadcasting, by the another node (112) to a fourth subset of the plurality of nodes (108, 110), a response to the first status message, the response to the first status message being part of a first portion of the action commit routine;

receiving (203), by the another node (112) of the plurality of nodes from the fourth subset of the plurality of nodes (108, 110), a fourth plurality of messages comprising a respective response to the first status message from each one of the third subset of the plurality of nodes (108, 110);

in response to a number of nodes within the fourth subset of the plurality of nodes (108, 110) being at equal to a pre-determined threshold, executing by the another node (112) a second portion of the action commit routine, the second portion of the action commit routine sequentially following the first portion, the executing comprising broadcasting (204), by the another node (112) to at least the fourth subset of the plurality of nodes (108, 110), the second status message, the broadcasting of the second status message being part of the second portion of the action commit routine.

receiving (205), by the another node (112) of the plurality of nodes from a fourth subset of the plurality of nodes (108, 110), a fifth plurality of messages comprising a respective second status message from each one of the fifth subset of the plurality of nodes;

in response to a number of nodes within the fifth subset of the plurality of nodes (108, 110) being at least equal to the pre-determined threshold, executing by the another node (112) the third portion of the action commit routine, the executing comprising broadcasting (206), by the another node (112) to at least the fifth subset of the plurality of nodes (108, 110), the third status message, the broadcasting of the third status message being part of the third portion of the action commit routine;

receiving (207), by the another node (112) of the plurality of nodes from a sixth subset of the plurality of nodes (108, 110), a sixth plurality of messages comprising a respective third status message from each one of the sixth subset of the plurality of nodes (108, 110); and executing (208), by the another node (112), at least a portion of the first action according to a pre-determined routine.

CLAUSE 14. A distributed computing system (104) for providing an action commit routine to at least a client device (102) communicatively coupled to the distributed computing system (104), the distributed computing system (104) comprising:

a plurality of nodes (108, 110, 112), each node of the plurality of nodes comprising:

a network interface, the network interface interlinking each node of the plurality of nodes to each other node of the plurality of nodes over the communication network;

an information storage medium, and a processor coupled to the information storage medium, the processor being configured to have access to computer readable commands which commands, when executed, cause the processor to perform, after a particular node (108) of the plurality of nodes (108, 110, 112) receive a first client message including an indication of an action from the client device (102) and broadcast a first status message including an indication of the first action to a remainder of the plurality of nodes (108, 110, 112), the broadcasting of the first status message being a first portion of the action commit routine:

receive, (203) by a given node (110) of the plurality of nodes (108, 110, 112) from a first subset of the plurality of nodes (108, 112), via the communication network, a first plurality of response messages comprising a respective response to the first status message from each one of the first subset of the plurality of nodes (108, 112);

in response to a number of nodes within the first subset of the plurality of nodes (108, 112) being at least equal to a pre-determined threshold, execute by the given node (110) a second portion of the action commit routine, the second portion of the action commit routine sequentially following the first portion, the executing comprising broadcasting (204), by the given node (110) to at least the first subset of the plurality of nodes (108, 112) via the communication network, a second status message, the broadcasting of the second status message being part of the second portion of the action commit routine.

What is claimed is:

1. A method for executing an action commit routine in a distributed computing system, the distributed computing system having a plurality of nodes, each node of the plurality of nodes being aware of each other's presence within the distributed computing system, the method comprising:

receiving, by a particular node of the plurality of nodes, a first client message from a client device that is communicatively coupled to the distributed computing system via a communication network, the first client message including a request for the distributed computing system to execute a first action;

broadcasting, by the particular node to a remainder of the plurality of nodes, a first status message including an indication of the first action, the broadcasting of the first status message being a first portion of the action commit routine;

receiving, by a given node of the plurality of nodes from a first subset of the plurality of nodes, a first plurality of response messages comprising a respective response to the first status message from each one of the first subset of the plurality of nodes;

in response to a number of nodes within the first subset of the plurality of nodes being at least equal to a pre-determined threshold: executing, by the given node, a second portion of the action commit routine, the second portion of the action commit routine sequentially following the first portion, the executing comprising:

broadcasting, by the given node to at least the first subset of the plurality of nodes, a second status message, the broadcasting of the second status message being part of the second portion of the action commit routine; and wherein the action commit routine is independently executable at each node of the plurality of nodes.

2. The method of claim 1, wherein the first portion of the action commit routine further comprises:

receiving, by the given node of the plurality of nodes from the particular node, the first status message including the indication of the first action; and broadcasting, by the given node to another subset of the plurality of nodes, a response to the first status message.

3. The method of claim 2, the action commit routine further comprising a third portion of the action commit routine, the third portion of the action commit routine sequentially following the second portion, the method further comprising:

receiving, by the given node of the plurality of nodes from a second subset of the plurality of nodes, a second plurality of messages comprising a respective second status message from each one of the second subset of the plurality of nodes;

in response to a number of nodes within the second subset of the plurality of nodes being at least equal to the pre-determined threshold, executing by the given node the third portion of the action commit routine, the executing comprising broadcasting, by the given node to at least the second subset of the plurality of nodes, a third status message, the broadcasting of the third status message being part of the third portion of the action commit routine.

4. The method of claim 3, further comprising:

receiving, by the given node of the plurality of nodes from a third subset of the plurality of nodes, a third plurality of messages comprising a respective third status message from each one of the third subset of the plurality of nodes; and in response to a number of nodes within the third subset of the plurality of nodes being at least equal to the pre-determined threshold, executing, by the given node, at least a portion of the first action according to a pre-determined routine.

5. The method of claim 4, further comprising returning, by the given node, a result of the first action to the particular node, the result of the first action to be aggregated with respective results of the first action of the third subset of the plurality of nodes by the particular node and transmitted back to the client device.

6. The method of claim 5, wherein the another subset, the first subset, the second subset and the third subset each comprise the same nodes of the plurality of nodes.

7. The method of claim 6, the method further comprising:

monitoring by the given node a timeout parameter associated with the first portion of the action commit routine and in response to the timeout parameter exceeding a first pre-defined timeout threshold, and wherein said executing by the given node the second portion of the action commit routine is executed without waiting for additional response messages.

8. The method of claim 7, the method further comprising:

monitoring by the given node the timeout parameter, the timeout parameter being further associated with the second portion of the action commit routine and in response to the timeout parameter exceeding a second pre-defined timeout threshold, and wherein said executing by the given node the third portion of the action commit routine is executed without waiting for additional response messages.

9. The method of claim 8, the method further comprising:

monitoring by the given node the timeout parameter, the timeout parameter being further associated with the third portion of the action commit routine and in response to the timeout parameter exceeding a third pre-defined timeout threshold, and wherein said executing by the given node the first action is executed without waiting for additional response messages.

10. The method of claim 8, wherein the pre-determined threshold is at least floor (n/2) nodes, where n is the number of nodes within the plurality of nodes.

11. The method of claim 1, wherein each node of the plurality of nodes is associated with a respective unique ID and wherein each node of the plurality of nodes stores an indication of the respective unique ID of each other node of the plurality of nodes, thereby allowing each node of the plurality of nodes be aware of each other's presence within the distributed computing system.

12. The method of claim 4, wherein the given node of the plurality of nodes comprises a memory, and wherein the method further comprises, executing by the given node of the plurality of nodes, prior to respectively executing each one of the first portion of the action commit routine, second portion of the action commit routine and the third portion of the action commit routine:

storing the first status of message in the memory;
storing the first plurality of messages in the memory;
storing the second plurality of messages in the memory; and
storing the third plurality of messages in the memory.

13. The method of claim 1, the method further comprising, for another node of the plurality of nodes:

receiving, by the another node of the plurality of nodes from the particular node, the first status message including the indication of the first action;

broadcasting, by the another node to a fourth subset of the plurality of nodes, a response to the first status message, the response to the first status message being part of a first portion of the action commit routine;

receiving, by the another node of the plurality of nodes from the fourth subset of the plurality of nodes, a fourth plurality of messages comprising a respective response to the first status message from each one of the third subset of the plurality of nodes;

in response to a number of nodes within the fourth subset of the plurality of nodes being at least equal to a pre-determined threshold, executing by the another node a second portion of the action commit routine, the second portion of the action commit routine sequentially following the first portion, the executing comprising broadcasting, by the another node to at least the fourth subset of the plurality of nodes, the second status message, the broadcasting of the second status message being part of the second portion of the action commit routine;

receiving, by the another node of the plurality of nodes from a fourth subset of the plurality of nodes, a fifth plurality of messages comprising a respective second status message from each one of the fifth subset of the plurality of nodes;

in response to a number of nodes within the fifth subset of the plurality of nodes being at least equal to the pre-determined threshold, executing by the another node the third portion of the action commit routine, the executing comprising broadcasting, by the another node to at least the fifth subset of the plurality of nodes, the third status message, the broadcasting of the third status message being part of the third portion of the action commit routine;

receiving, by the another node of the plurality of nodes from a sixth subset of the plurality of nodes, a sixth plurality of messages comprising a respective third status message from each one of the sixth subset of the plurality of nodes; and executing, by the another node, at least a portion of the first action according to a pre-determined routine.

14. A distributed computing system for providing an action commit routine to at least a client device communicatively coupled to the distributed computing system, the distributed computing system comprising:

a plurality of nodes, each node of the plurality of nodes comprising:

a network interface, the network interface interlinking each node of the plurality of nodes to each other node of the plurality of nodes over the communication network;

an information storage medium; and a processor coupled to the information storage medium, the processor being configured to have access to computer readable commands which commands, when executed, cause the processor to perform:

receiving, by a particular node of the plurality of nodes, a first client message including an indication of a first action from the client device;

broadcasting, by the particular node to a remainder of the plurality of nodes, a first status message including an indication of the first action, the broadcasting of the first status message being a first portion of the action commit routine;

receiving, by a given node of the plurality of nodes from a first subset of the plurality of nodes via the communication network, a first plurality of response messages comprising a respective response to the first status message from each one of the first subset of the plurality of nodes;

in response to a number of nodes within the first subset of the plurality of nodes being at least equal to a pre-determined threshold: executing, by the given node, a second portion of the action commit routine, the second portion of the action commit routine sequentially following the first portion, the executing comprises broadcasting, by the given node to at least the first subset of the plurality of nodes via the communication network, a second status message, the broadcasting of the second status message being part of the second portion of the action commit routine.

* * * * *